(12) United States Patent
Carrejo et al.

(10) Patent No.: US 9,441,458 B2
(45) Date of Patent: *Sep. 13, 2016

(54) VARIABLE $T_g$ SHAPE MEMORY POLYURETHANE FOR WELLBORE DEVICES

(75) Inventors: Nicholas Carrejo, Katy, TX (US); Michael H. Johnson, Katy, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 962 days.

This patent is subject to a terminal disclaimer.

(21) Appl. No.: 13/446,337

(22) Filed: Apr. 13, 2012

(65) Prior Publication Data

US 2012/0193019 A1 Aug. 2, 2012

Related U.S. Application Data

(62) Division of application No. 12/732,617, filed on Mar. 26, 2010, now Pat. No. 8,365,833.

(51) Int. Cl.
*E21B 41/00* (2006.01)
*E21B 43/10* (2006.01)
(Continued)

(52) U.S. Cl.
CPC .............. *E21B 41/00* (2013.01); *C09K 3/1021* (2013.01); *E21B 43/108* (2013.01); *F03G 7/065* (2013.01);
(Continued)

(58) Field of Classification Search
CPC ......... E21B 41/00; F03G 7/065; C09K 3/10; C09K 2003/1068; Y10T 156/1005; Y10T 29/49865; Y10T 166/30; Y10T 166/38; Y10T 166/381
See application file for complete search history.

(56) References Cited

U.S. PATENT DOCUMENTS 5,910,357 A 6/1999 Hachisuka et al.
6,043,290 A 3/2000 Petrella
(Continued)

OTHER PUBLICATIONS

Abstract of H. Tobushi et al., "Thermomechanical Properties of Polyurethane-Shape Memory Polymer Foam," 11th ICAST: International Conference on Adaptive Structures and Technologies, Nagoya, Japan, 2001, vol. 12, No. 4, (available from http://cat.inistfr/?Modele+afficheN&cpsidt+13872499).
(Continued)

*Primary Examiner* — Christopher M Koehler
(74) *Attorney, Agent, or Firm* — Mossman Kumar & Tyler PC

(57) ABSTRACT

Wellbore devices for use in filtration, wellbore isolation, production control, lifecycle management and wellbore construction may include at least a first and a second shape-memory material each having an altered geometric position and each an original geometric position. Each shape-memory material may include a polyurethane material held in the altered geometric run-in position at a temperature below glass transition temperature ($T_g$), where the $T_g$s and/or the respective slope changes of the first and second polyurethane materials are different. Once the wellbore device is in place downhole and the first and second shape-memory materials are subjected to temperatures above their $T_g$s, the materials will deploy and expand to recovered geometric positions at or near their original geometric positions to perform their filtration, isolation, control or other function. These deployments or expansions may occur at different times or rates.

5 Claims, 5 Drawing Sheets

(51) Int. Cl.
*C09K 3/10* (2006.01)
*F03G 7/06* (2006.01)
*E21B 43/08* (2006.01)

(52) U.S. Cl.
CPC ............ *C08L 2201/12* (2013.01); *E21B 43/08* (2013.01); *Y10T 29/49865* (2015.01); *Y10T 156/1005* (2015.01)

(56) References Cited

U.S. PATENT DOCUMENTS

| | | | |
|---|---|---|---|
| 6,103,851 A | 8/2000 | Roser et al. | |
| 6,566,482 B2 | 5/2003 | Haas et al. | |
| 6,583,194 B2 | 6/2003 | Sendijarevic | |
| 6,613,864 B1 | 9/2003 | Porter et al. | |
| 6,964,626 B1 | 11/2005 | Wu et al. | |
| 7,013,979 B2 | 3/2006 | Richard | |
| 7,048,048 B2 * | 5/2006 | Nguyen et al. | 166/227 |
| 7,318,481 B2 | 1/2008 | Richard | |
| 7,392,852 B2 | 7/2008 | Richard | |
| 7,708,073 B2 | 5/2010 | Richard et al. | |
| 7,743,835 B2 | 6/2010 | Willauer | |
| 7,926,565 B2 | 4/2011 | Duan et al. | |
| 2005/0256288 A1 | 11/2005 | Zhu et al. | |
| 2006/0185849 A1 | 8/2006 | Edwards et al. | |
| 2007/0240877 A1 * | 10/2007 | O'Malley et al. | 166/179 |
| 2008/0196900 A1 | 8/2008 | Leibfried et al. | |
| 2008/0296020 A1 | 12/2008 | Willauer | |
| 2008/0296023 A1 | 12/2008 | Willauer | |
| 2009/0000793 A1 | 1/2009 | Guillot et al. | |
| 2009/0084539 A1 * | 4/2009 | Duan et al. | 166/187 |
| 2010/0089565 A1 * | 4/2010 | Duan et al. | 166/51 |
| 2010/0132944 A1 | 6/2010 | Li et al. | |
| 2010/0163250 A1 * | 7/2010 | Schultz et al. | 166/381 |
| 2010/0236794 A1 | 9/2010 | Duan et al. | |
| 2011/0232901 A1 | 9/2011 | Carrejo et al. | |
| 2013/0153246 A1 | 6/2013 | Carrejo et al. | |

OTHER PUBLICATIONS

Abstract of S. H. Lee et al., "Shape Memory Effects of Molded Flexible Polyurethane Foam," Smart Materials and Structures, Oct. 23, 2007, vol. 16, ( (available from http://www.iop.org/EJ/abstractf0964-1726/16/052).

ISR & WO in PCT/US2014/011300 dated May 7, 2014.

* cited by examiner

VARIABLE $T_g$ SHAPE MEMORY POLYURETHANE FOR WELLBORE DEVICES

CROSS-REFERENCE TO RELATED APPLICATION

This application is a divisional from U.S. Ser. No. 12/732,617 filed Mar. 26, 2010, incorporated herein by reference in its entirety.

TECHNICAL FIELD

The present invention relates to devices used in oil and gas wellbores employing shape-memory materials that remain in an altered geometric state during run-in; once the devices are in place downhole and are exposed to a given temperature at a given amount of time, the devices attempt to return to their original geometric position prior to alteration.

TECHNICAL BACKGROUND

Various methods of filtration, wellbore isolation, production control, wellbore lifecycle management, and wellbore construction are known in the art. The use of shaped memory materials in these applications have been disclosed for oil and gas exploitation. Shape Memory Materials are smart materials that have the ability to return from a deformed state (temporary shape) to their original (permanent) shape induced by an external stimulus or trigger (e.g. temperature change). In addition to temperature change, the shape memory effect of these materials may also be triggered by an electric or magnetic field, light or a change in pH. Shape-memory polymers (SMPs) cover a wide property range from stable to biodegradable, from soft to hard, and from elastic to rigid, depending on the structural units that constitute the SMP. SMPs include thermoplastic and thermoset (covalently cross-linked) polymeric materials. SMPs are known to be able to store multiple shapes in memory.

Dynamic Mechanical Analysis (DMA), dynamic mechanical thermal analysis (DMTA) or dynamic thermomechanical analysis is a technique used to study and characterize SMP materials. It is most useful for observing the viscoelastic nature of these polymers. The sample deforms under a load. From this, the stiffness of the sample may be determined, and the sample modulus may be calculated. By measuring the time lag in the displacement compared to the applied force it is possible to determine the damping properties of the material. The time lag is reported as a phase lag, which is an angle. The damping is called tan delta, as it is reported as the tangent of the phase lag.

Viscoelastic materials such as shape-memory polymers typically exist in two distinct states. They exhibit the properties of a glass (high modulus) and those of a rubber (low modulus). By scanning the temperature during a DMA experiment this change of state, the transition from the glass state to the rubber state, may be characterized. It should be noted again that shaped memory may be altered by an external stimulus other than temperature change.

The storage modulus $\epsilon'$ (elastic response) and loss modulus $\epsilon''$ (viscous response) of a polymer as a function of temperature are shown in FIG. 1. The nature of the transition state of the shaped memory polymer affects material's shape recovery behavior and can be descriptive of the polymer's shape recovery. Referring to FIG. 1, the Glass State is depicted as a change in storage modulus in response to change in temperature which yields a line of constant slope. The Transition State begins when a slope change occurs in the storage modulus as the temperature is increased. This is referred to as the $T_g$ Onset which in FIG. 1 is approximately 90° C. The $T_g$ Onset is also the point where shape recovery can begin. $T_g$ for a shape-memory polymer described by FIG. 1 is defined as the peak of the loss modulus, which in FIG. 1 is approximately 110° C. If the slope's change of the storage modulus were represented by a vertical line of undefined slope, the material shape recovery would occur at a specific temperature and transition immediately from the glassy state to the rubber state. Generally, the more gradual the slope change of the storage modulus in the transition state, the greater the range of temperatures which exhibit characteristics of both the glass and rubber states. The transition state is the area of interest for the SMP material's shape recovery characteristics. It should also be evident that shape recovery would occur more slowly if stimulus temperature is closer the $T_g$ Onset temperature and shape recovery would be more rapid as the stimulus temperature approached or exceeded the $T_g$.

One method of making use of the unique behavior of shape-memory polymers is via temperature response described above. An example is seen in FIG. 2. The finished molded part 100 of shape-memory polymer has a defined $T_g$ and $T_g$ Onset. This may be considered an original geometric position of the shape-memory material. The part is then heated close to the $T_g$ of the polymer. Force is applied to the finished part to reshape the part into a different configuration or shape 100'. This may be considered an altered geometric position of the shape-memory material. The reshaped part 100' is then cooled below the shape-memory polymer's $T_g$ Onset and the force removed. The finished part 100' will now retain the new shape until the temperature of the part is raised to the $T_g$ Onset at which point shape recovery will begin and the part will attempt to return to its original shape 100" or if constrained, the part will conform to the new constrained shape 100'. This shape 100" may be considered the shape-memory material's recovered geometric position.

U.S. Pat. No. 7,318,481 assigned to Baker Hughes Incorporated disclosed a self-conforming expandable screen which comprises a thermosetting open cell shape-memory polymeric foam. The foam material composition is formulated to achieve the desired transition temperature slightly below the anticipated downhole temperature at the depth at which the assembly will be used. This causes the conforming foam to expand at the temperature found at the desired depth.

It would thus be very desirable and important to discover a method and device for deploying an element made of shaped memory materials at a particular location downhole to achieve some desired element of filtration, wellbore isolation, production control, wellbore lifecycle management, and wellbore construction. Generally, the more versatility for deploying an element the better, as this gives more flexibility in device designs and provides the operator more flexibility in designing, placement and configuration of the wellbore devices.

SUMMARY

There is provided, in one non-limiting form, a wellbore filtration device involving at least two shape-memory materials. The device includes a first shape-memory material having a position of altered geometry and where the original geometry is recoverable, where the shape-memory material is maintained in the altered geometry at a temperature below a first onset glass transition temperature, and where the shape-memory material expands from its altered geometric position to its original geometric position when it is heated to a temperature above the first onset glass transition temperature. Additionally, the device includes a second shape-memory material having an altered geometric shape and an original geometric shape where the shape-memory material is maintained in the altered geometric shape at a temperature below a second onset glass transition temperature. The second onset glass transition temperature is different than the first onset glass transition temperature, and the shape-memory material recovers from its altered geometric shape to its original geometric shape when it is heated to a temperature above the second onset glass transition temperature.

In another non-limiting embodiment the onset glass transition temperatures may be the same for two shaped memory materials. However the slope change during the transition state from glass state to rubber state may vary. This would allow the altered geometric shapes of the two shaped memory materials to recover their respective original geometric shape but at differing recovery rates.

There is additionally provided in another non-restrictive version a method of manufacturing a wellbore device. The method includes placing in any order or simultaneously, a first shape-memory material and a second shape-memory material on a billet, each in a respective original geometric position. The first shape-memory material has a first onset glass transition temperature and a first slope change during a first transition state from a first glass state to a first rubber state. The second shape-memory material has a second onset glass transition temperature and a second slope change during a second transition state from a second glass state to a second rubber state. The method further involves altering the original geometric positions of the first and second shape-memory materials at a temperature above both the first and second onset $T_g$ to change the original geometric positions of the first and second shape-memory materials respectively. Further the method includes lowering the temperature of the first and second shape-memory materials to a temperature below the first and second onset $T_g$s, respectively, where the first and second shape-memory materials each maintain their altered geometric positions. The first shape-memory material and the second shape-memory material are different by a parameter where the first onset glass transition temperature is different from the second onset glass transition temperature and/or the first slope change is different from the second slope change.

In another non-limiting embodiment there is provided a wellbore device with a variable onset glass transition temperature within a single molded part. One method of manufacturing such a part involves mixing a first isocyanate portion (comprising an isocyanate) with a first polyol portion (comprising a polyol) in a first ratio of polyol to isocyanate to form a first polyurethane material having a first onset glass transition temperature. The method also involves mixing a second isocyanate portion (comprising an isocyanate, which may be the same as or different from the isocyanate in the first isocyanate portion) with a second polyol portion (comprising a polyol, which may be the same as or different from the polyol in the first polyol portion) in a second ratio to form a second material having a second onset glass transition temperature. The first onset $T_g$ and the second onset $T_g$ may be different from one another. Alternatively or in addition thereto, a first slope change of the first polyurethane material is different from a second slope change of the second polyurethane material. The method additionally involves altering the geometric shape of the first and second shaped memory materials at a temperature above both the first and second onset $T_g$s to change the first and second original geometric shape to a first and second altered geometric shape, respectively. Further, the method involves lowering the temperature of the respective altered geometric shapes of the first and second materials to a temperature below the first and second onset $T_g$s where the first and second materials each maintain their respective altered geometric shape.

Further there is provided in a different, non-restrictive version a method of installing a wellbore device on a downhole tool in a wellbore. The method may include securing a downhole tool to a string of perforated tubing. The downhole tool may involve a filtration device including a first shape-memory material, where the first shape-memory material (e.g. a polyurethane) has an altered geometric shape for run-in position and an original geometric shape recoverable at a predetermined wellbore position. The first shape-memory material is maintained in the run-in geometry below a first onset glass transition temperature of the first shape-memory porous material. The device may also include a second shape-memory material, which may also be a polyurethane. The second shape-memory material also has an altered geometric shape for run-in and an original geometric shape recoverable at a predetermined position in the wellbore. The second shape-memory material is maintained in the run-in geometric shape below a second onset glass transition temperature of the second shape-memory material. The first onset glass transition temperature $T_g$ is different from the second onset glass transition temperature $T_g$. The method additionally includes running the downhole tool in a wellbore, as well as expanding the first shape-memory material from its run-in geometric shape to its original geometric shape for instance when the material is heated beyond its onset $T_g$. The second shape-memory material may be separately recovered at a separate onset $T_g$ different from the onset $T_g$ of the first shape-memory material, at a different time.

Figure 1:
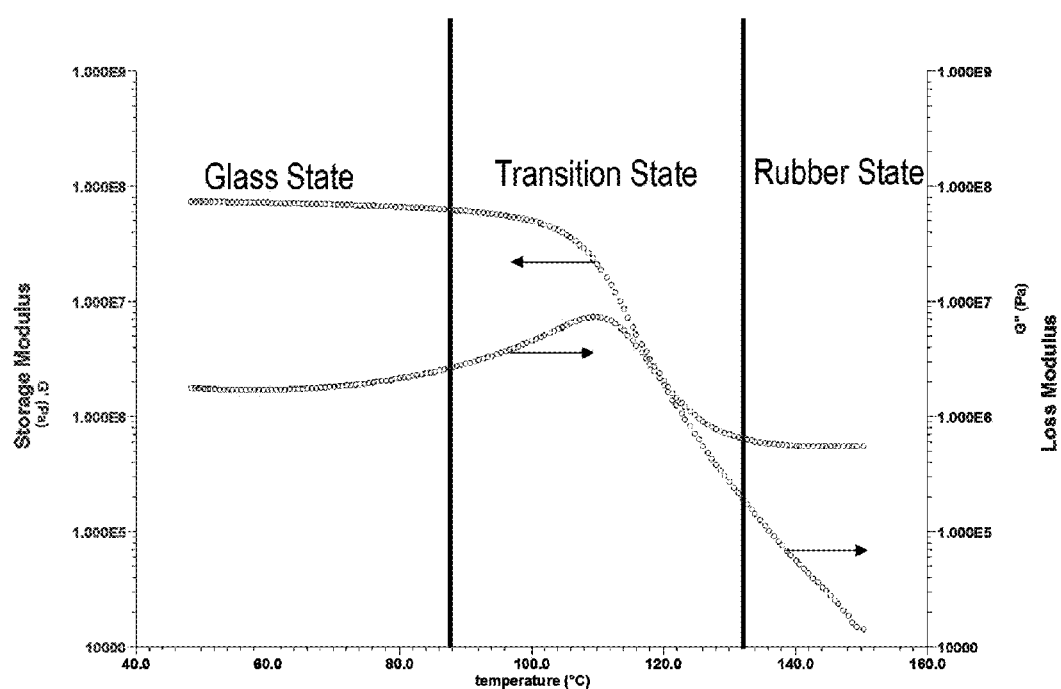
FIG. 1 is a graph of storage modulus $\epsilon'$ (elastic response) (left vertical axis) and modulus $\epsilon''$ (viscous response) as a function of temperature for a shape memory polymers illustrating the change in each modulus as the polymer is heated from the Glass State through the Transition State to the Rubber State.
Figure 2:
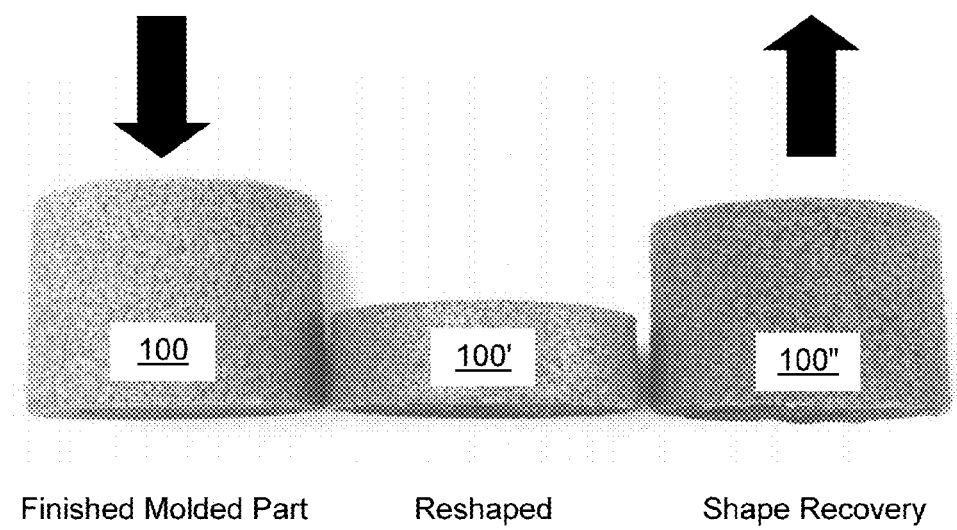
FIG. 2 is a photograph of a finished shape-memory polymer part before it is heated close to the $T_g$ of the polymer and force is applied to reshape it to a different configuration or shape and then cooled below the polymer's onset $T_g$, and finally when the part is heated to the onset $T_g$ at which point recovery will begin and the part returns to at or near its original shape.

It will be appreciated that FIGS. 3 through 8 are simply schematic illustrations which are not to scale and that the relative sizes and proportions of different elements may be exaggerated for clarity or emphasis.

DETAILED DESCRIPTION

It has been discovered that wellbore devices, such as those used in filtration, wellbore isolation, production control, lifecycle management, wellbore construction and the like may be improved by including at least two different shape-memory materials that are run into the wellbore in altered geometric positions or shapes where the shape-memory materials change to their respective original geometric positions or shapes at different $T_g$s and/or different slope changes (the slope change in the respective transition state from a glass state to a rubber state).

The shape-memory material is made in one non-limiting embodiment from one or more polyol, such as, but not limited to, a polycarbonate polyol and at least one isocyanate, including, but not necessarily limited to, a modified diphenylmethane diisocyanate (MDI), as well as other additives including, but not necessarily limited to, blowing agents, molecular cross linkers, chain extenders, surfactants, colorants and catalysts.

The shape-memory polyurethane materials are capable of being geometrically altered, in one non-limiting embodiment compressed substantially, e.g., 20~30% of their original volume, at temperatures above their onset glass transition temperatures ($T_g$) at which the material becomes soft. While still being geometrically altered, the material may be cooled down well below its onset $T_g$, or cooled down to room or ambient temperature, and it is able to remain in the altered geometric state even after the applied shape altering force is removed. When the material is heated near or above its onset $T_g$, it is capable of recovery to its original geometric state or shape, or close to its original geometric position; a state or shape which may be called a recovered geometric position. In other words, the shape-memory material possesses hibernated shape-memory that provides a shape to which the shape-memory material naturally takes after its manufacturing. The compositions of polyurethane are able to be formulated to achieve desired onset glass transition temperatures which are suitable for the downhole applications, where deployment can be controlled for temperatures below onset $T_g$ of devices at the depth at which the assembly will be used.

It has been further discovered that various ratios of polyol to isocyanate may be used to provide a polyurethane formulation having various onset $T_g$s. As noted, the polyurethane with different onset $T_g$s may be geometrically altered and then run downhole. When various target temperatures are reached, the device will then deploy at various rates allowing for soft, conformable deployments reinforced by hard, rigid, material. That is, the differing onset $T_g$ of different portions of the device not only affect the temperature at which that portion of the device will return to its original shape, but will also affect the hardness of the material and rates of deployment.

Generally, polyurethane polymer or polyurethane foam is considered poor in thermal stability and hydrolysis resistance, especially when it is made from polyether or polyester. It has been previously discovered herein that the thermal stability and hydrolysis resistance are significantly improved when the polyurethane is made from polycarbonate polyols and MDI diisocyanates. The compositions of polyurethane foam herein are able to be formulated to achieve different glass transition temperatures within the range from 60° C. to 170° C., which is especially suitable to meet most downhole application temperature requirements. More details about these particular polyurethane foams or polyurethane elastomers may be found in U.S. patent application Ser. No. 12/250,062, published as U.S. Pat. No. 7,926,565, incorporated herein by reference in its entirety.

In one specific non-limiting embodiment, the shape-memory material is a polyurethane material that is extremely tough and strong and that is capable of being geometrically altered and returned to substantially its original geometric shape. As noted, the $T_g$ of the shape-memory polyurethane foam ranges from about 40° C. to about 200° C. and it is geometrically altered by mechanical force at 40° C. to 190° C. It will be appreciated that in the embodiment where two or more shape-memory materials are employed and each have a different $T_g$ from each other, all of the $T_g$s will fall with the range of about 40° C. to about 200° C., but they will be different from each other. While still in geometrically altered state, the material may be cooled down to room temperature or some other temperature below the $T_g$ of each shape-memory material. The shape-memory polyurethane is able to remain in the altered geometric state even after applied mechanical force is removed. When material is heated to above its onset $T_g$, it is able to return to its original shape, or close to its original shape. The time required for geometric shape recovery can vary from about 20 minutes to 40 hours or longer depending on the slope of the transition curves as the material moves from a glass state to a rubber state. If the material remains below the onset $T_g$ it remains in the geometrically altered state and does not change its shape.

Ideally, when shape-memory polyurethane is used as a downhole device, it is preferred that the device remains in an altered geometric state during run-in until it reaches to the desired downhole location. Usually, downhole tools traveling from surface to the desired downhole location take hours or days. Thus, it is important to match the onset $T_g$s of the material with the expected downhole temperatures.

In some non-limiting embodiments, when the temperature is high enough during run-in, the devices made from the shape-memory polyurethane could start to recover. To avoid undesired early recovery during run-in, delaying methods may or must be taking into consideration. In one specific, but non-limiting embodiment, a poly(vinyl alcohol) (PVA) film or other suitable film may be used to wrap or cover the outside surface of devices made from shape-memory polyurethane to prevent recovery during run-in. Once devices are in place downhole for a given amount of time at temperature, the PVA film is capable of being dissolved in the water, emulsions or other downhole fluids and, after such exposure, the shape-memory devices may recover to their original geometric shape or conform to the bore hole or other space. In another alternate, but non-restrictive specific embodiment, the devices made from the shape-memory polyurethane may be coated with a thermally fluid-degradable rigid plastic such as polyester polyurethane plastic and polyester plastic. By the term "thermally fluid-degradable plastic" is meant any rigid solid polymer film, coating or covering that is degradable when it is subjected to a fluid, e.g. water or hydrocarbon or combination thereof and heat. The covering is formulated to be degradable within a particular temperature range to meet the required application or downhole temperature at the required period of time (e.g. hours or days) during run-in. The thickness of delay covering and the type of degradable plastics or other materials may be selected to be able to keep devices of shape-memory polyurethane from recovery during run-in. Once the device is in place downhole for a given amount of time at temperature, these degradable plastics decompose which allows the devices to recover their original geometric shape or conform to the inner wall of the bore hole or the casing. In other words, the covering that inhibits or prevents the shape-memory material from returning to its original geometric position or being prematurely deployed may be removed by dissolving, e.g. in an aqueous or hydrocarbon fluid, or by thermal degradation or hydrolysis, with or without the application of heat, in another non-limiting example, destruction of the crosslinks between polymer chains of the material that makes up the covering.

The polyurethane material may be formed by combining two separate portions of chemical reactants and reacting them together. These two separate portions are referred to herein as the isocyanate portion and polyol portion. The isocyanate portion may comprise a modified isocyanate (MI) or a modified diphenylmethane diisocyanate (MDI) based monomeric diisocyanate or polyisocyanate. The polyol portion may include, but not necessarily be limited to, a polyether, polyester or polycarbonate-based di- or multi-functional hydroxyl-ended prepolymer.

Water may be included as part of the polyol portion and may act as a blowing agent to provide a porous foam structure when carbon dioxide is generated from the reaction with the isocyanate and water when the isocyanate portion and the polyol portion are combined.

In one non-restrictive embodiment, the isocyanate portion may contain modified MDI MONDUR PC sold by Bayer or MDI prepolymer LUPRANATE 5040 sold by BASF, and the polyol portion may contain (1) a poly(cycloaliphatic carbonate) polyol sold by Stahl USA under the commercial name PC-1667; (2) a tri-functional hydroxyl cross linker trimethylolpropane (TMP) sold by Alfa Aesar; (3) an aromatic diamine chain extender dimethylthiotoluenediamine (DMTDA) sold by Albemarle under the commercial name ETHACURE 300; (4) a catalyst sold by Air Products under the commercial name POLYCAT 77; (5) a surfactant sold by Air Products under the commercial name DABCO DC198; (6) a cell opener sold by Degussa under the commercial name ORTEGOL 501, (7) a colorant sold by Milliken Chemical under the commercial name REACTINT Violet X80LT; and (8) water.

The ratio between two separate portions of chemical reactants which are referred to herein as the isocyanate portion and polyol portion may, in one non-limiting embodiment, be chemically balanced close to 1:1 according to their respective equivalent weights. The equivalent weight of the isocyanate portion is calculated from the percentage of NCO (isocyanate) content which is referred to herein as the modified MDI MONDUR PC and contains 25.8% NCO by weight. Other isocyanates such as MDI prepolymer LUPRANATE 5040 sold by BASF contains 26.3% NCO by weight are also acceptable. The equivalent weight of the polyol portion is calculated by adding the equivalent weights of all reactive components together in the polyol portion, which includes polyol, e.g., PC-1667, water, molecular cross linker, e.g., TMP, and chain extender, e.g., DMTDA. The glass transition temperature of the finished polyurethane foam may be adjustable via different combinations of isocyanate and polyol. In general, the more isocyanate portion, the higher the $T_g$ that is obtained. In one non-limiting embodiment, the equivalent ratio of isocyanate portion to polyol portion ranges from 1.2:1 to 1:1.2, alternatively from 1.1 to 1 to 1 to 1.1. When the one or more polyurethanes are used, in one non-restrictive versions, each polyurethane has a different ratio, but the ratio is within these ranges.

As previously mentioned, various ratios of polyol to isocyanate may be used to provide polyurethane polymers with variable $T_g$s throughout the molded polymer part. This will allow the polymer molded to have unique properties, such as various sections of the downhole tool and/or wellbore device to undergo shaped memory influences as the temperatures change within the wellbore, such as heating up or cooling down. In one non-restrictive instance, the foam could be open cell foam for filtration, sand control or other application. After various target temperatures are experienced the screen or tool will then deploy at various rates allowing for soft conformable deployments (in a non-limiting embodiment, an outer layer or layers) reinforced by relatively harder, more rigid compacted foam (the inner layer or layers).

Altering or varying the injection rates during processing will allow for imbedded layers of polyurethane with varying levels of $T_g$. Ultimately, the varying $T_g$s will permit parts of the material to be deployed at certain target temperatures while keeping other layers properly altered and "frozen". It will be understood that the portions of the material with different $T_g$s may or may not be in discrete, discernable layers or portions on the tool or device.

Other foam components include a chain extender, in one non-limiting embodiment, dimethylthiotoluenediamine (DMTDA) sold by Albemarle under the commercial name ETHACURE 300, which is a liquid aromatic diamine curative that provides enhanced high temperature properties. Other suitable chain extenders include but are not limited to 4,4'-methylene bis (2-chloroaniline), "MOCA", sold by Chemtura under the commercial name VIBRACURE® A 133 HS, and trimethylene glycol di-p-aminobenzoate, "MCDEA", sold by Air Products under the commercial name VERSALINK 740M.

In certain embodiments, either amine-based or metal-based catalysts are included to achieve good properties of polyurethane foam materials. Such catalysts are commercially available from companies such as Air Products. Suitable catalysts that provide especially good properties of polyurethane foam materials include, but are not necessarily limited to, pentamethyldipropylenetriamine, an amine-based catalyst sold under the commercial name POLYCAT 77 by Air Products, and dibutyltindilaurate, a metal-based catalyst sold under the commercial name DABCO T-12 by Air Products.

A small amount of surfactant, e.g., 0.5% of total weight, such as the surfactant sold under the commercial name DABCO DC-198 by Air Products and a small amount of cell opener, e.g., 0.5% of total weight, such as cell openers sold under the commercial names ORTEGOL 500, ORTEGOL 501, TEGOSTAB B8935, TEGOSTAB B8871, and TEGOSTAB B8934 by Degussa may be added into the formulations. DABCO DC-198 is a silicone-based surfactant from Air Products. Other suitable surfactants include, but are not necessarily limited to, fluorosurfactants sold by DuPont under commercial names ZONYL 8857A and ZONYL FSO-100. Colorant may be added in the polyol portion to provide desired color in the finished products. Such colorants are commercially available from companies such as Milliken Chemical which sells suitable colorants under the commercial name REACTINT.

In one particular, but non-restrictive embodiment, the polyol portion including poly(cycloaliphatic carbonate) or other polyol and other additives such as cross linker, chain extender, surfactant, colorant, water, and catalyst is preheated to 90° C. before being combined with the isocyanate portion. The isocyanate portion is combined with the polyol portion and a reaction is immediately initiated and the mixture's viscosity increases rapidly. As mentioned, the amount of polyol relative to isocyanate should be varied at least once, potentially numerous times, to give a varied polyurethane where different portions have different $T_g$s.

Due to the high viscosity of the mixture and the fast reaction rate, a suitable mixer is recommended to form the polyurethane material. Although there are many commercially available fully automatic mixers specially designed for two-part polyurethane processing, it is found that mixers such as KITCHENAID® type mixers with single or double blades work particularly well for batch quantities. In large-scale mixing, eggbeater mixers and drill presses have been found to work particularly well.

In mixing the isocyanate and polyol portions, the amount of isocyanate and polyol included in the mixture should be chemically balanced according to their equivalent weight and the desired $T_g$s or range of glass transition temperatures. In one specific non-limiting embodiment, up to 5% more isocyanate by equivalent weight is combined with the polyol portion.

In one embodiment, the ratio between isocyanate and polycarbonate polyol is about 1:1 by weight. In one non-limiting embodiment, the polyol portion may be formed by 46.0 g of PC-1667 poly(cycloaliphatic carbonate) polycarbonate combined with 2.3 g of TMP cross-linker, 3.6 g of DMTDA chain extender, 0.9 g DABCO DC-198 surfactant, 0.4 g of ORTEGOL 501, 0.1 g of REACTINT Violet X80LT colorant, 0.01 g of POLYCAT 77 catalyst, and 0.7 g of water blowing agent to form the polyol portion. The polyol portion is preheated to 90° C. and mixed in a KITCHENAID® type single blade mixer with 46.0 g of MDI MONDUR PC. As will be recognized by persons of ordinary skill in the art, these formulations can be scaled-up to form larger volumes of this shape-memory material.

The mixture containing the isocyanate portion and the polyol portion may be mixed for about 10 seconds and then poured into a mold and the mold immediately closed by placing a top metal plate thereon. Due to the significant amount of pressure generated by foaming process, a C-clamp may be used to hold the top metal plate and mold together to prevent any leakage of mixture. After approximately 2 hours at room temperature, the polyurethane foam material including a mold and a C-clamp may be placed inside an oven and "postcured" at a temperature of 110° C. for approximately 8 hours so that the polyurethane foam material reaches its full strength. These times and temperatures are simply representative and should not be taken as limiting. After cooled down to room temperature, the polyurethane material is sufficiently cured such that the mold may be removed.

At this point, the polyurethane material is in its original, expanded shape having an original, or expanded, thickness. The $T_g$s of the polyurethane material are measured by Dynamic Mechanical Analysis (DMA) as 94.4° C. from the peak of loss modulus, G". The polyurethane material may be capable of being geometrically altered to at least 25% of original thickness or volume at temperature 125.0° C. in a confining mold. While still in the altered geometric state, the material is cooled down to room temperature. The shape-memory polyurethane is able to remain in the altered geometric state even after applied mechanical force is removed. When the material is heated to about 88° C., in one non-restrictive version, it is able to return to its original shape within 20 minutes. However, when the same material is heated to about 65° C. for about 40 hours, it does not expand or change its shape at all. In one non-limiting embodiment, a first portion of polyurethane foam may be heated to about 88° C. and thus return to its original shape and size at that temperature and a second portion of polyurethane foam may be heated to about 100° C. for sufficient time to return to its original shape and size to complete the expansion of the screen, e.g. This is possible because the different portions of the foam have different $T_g$s.

In another non-limiting embodiment, the ratio between isocyanate and polycarbonate polyol is about 1.5:1 by weight. In one non-restrictive embodiment, the polyol portion may be formed by 34.1 g of PC-1667 poly(cycloaliphatic carbonate) polycarbonate combined with 2.3 g of TMP cross linker, 10.4 g of DMTDA chain extender, 0.8 g DABCO DC-198 surfactant, 0.4 g of ORTEGOL 501 cell opener, 0.1 g of REACTINT Violet X80LT colorant, 0.01 g of POLYCAT 77 catalyst, and 0.7 g of water blowing agent to form the polyol portion. The polyol portion is preheated to 90° C. and mixed in a KITCHENAID® type single blade mixer with 51.2 g of MDI MONDUR PC. As will be recognized by persons of ordinary skill in the art, these formulations can be scaled-up to form larger volumes of this shape-memory material. Again, a change in the ratio of polyol to isocyanate will change the $T_g$.

The mixture containing the isocyanate portion and the polyol portion may be mixed for about 10 seconds and then poured into a mold and the mold immediately closed by placing a top metal plate thereon. Due to the significant amount pressure generated by foaming process, a C-clamp or other device may be used to hold the top metal plate and mold together to prevent any leakage of mixture. After approximately 2 hours, the polyurethane foam material including a mold and a C-clamp may be transferred into an oven and "postcured" at a temperature of 110° C. for approximately 8 hours so that the polyurethane material reaches its full strength. After cooled down to room temperature, the polyurethane material is sufficiently cured such that the mold can be removed.

The $T_g$ of this particular polyurethane material in this non-limiting example, may be measured as 117.0° C. by DMA from the peak of loss modulus, G".

As may be recognized, the polyurethane having more isocyanate than polyol by weight results in higher glass transition temperature. The polyurethane having less isocyanate than polyol by weight results in lower $T_g$. By formulating different combinations of isocyanate and polyol, different glass transition temperatures of shape-memory polyurethane may be achieved. Compositions of a shape-memory polyurethane material having a specific $T_g$ may be formulated based on actual downhole deployment/application temperature. In one non-restrictive version, the $T_g$s of a shape-memory polyurethane is designed to be about 20° C. higher than actual downhole deployment/application temperatures. Because the application temperature is lower than $T_g$, the material retains good mechanical properties.

In one non-restrictive embodiment, the shape-memory polyurethane in tubular shape may be altered under hydraulic pressure above glass transition temperature, and then cooled to a temperature well below the $T_g$ or room temperature while it is still under altering force. After the pressure is removed, the shape-memory polyurethane is able to remain at the new geometric state or shape.

Figure 3:
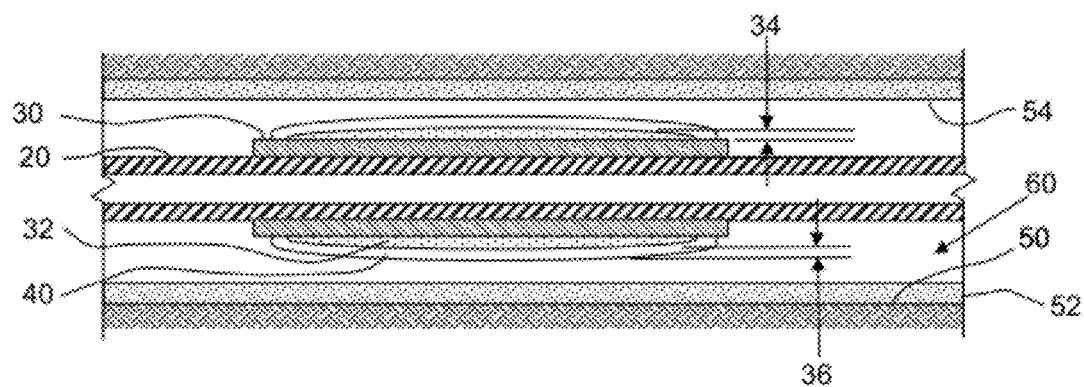
FIG. 3 is a schematic, cross-section view of a device which bears two shape-memory materials having different onset $T_g$s in concentric, layered configuration in their altered geometry, run-in thicknesses or volumes.
Figure 4:
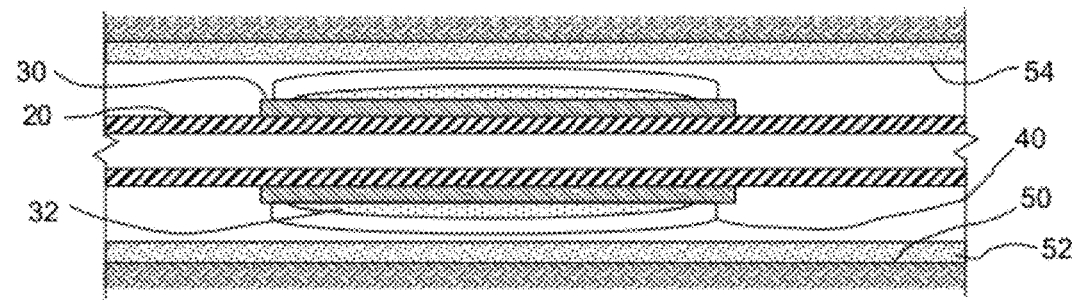
FIG. 4 is a schematic, cross-section view of the device of FIG. 3 where the outer shape-memory material has been permitted to recover or deploy so that it reaches part-way to the inner wall surface of the wellbore.
Figure 5:
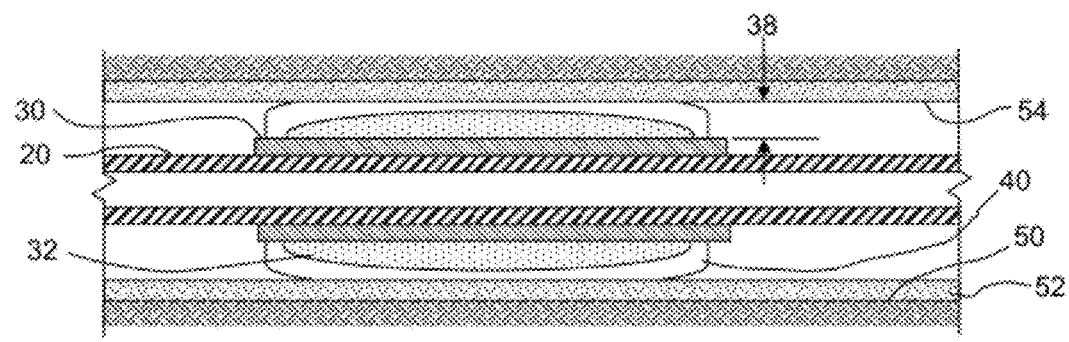
FIG. 5 is a schematic, cross-section view of the device of FIG. 4 where the inner shape-memory material has also been permitted to recover or deploy so that it firmly engages and fits to the inner wall surface of the wellbore.

With reference to FIGS. 3, 4 and 5 in operation, the tubing string 20 having device 30 including shape-memory materials 32 and 40 is run-in wellbore 50, which is defined by wellbore casing 52, to the desired location. Device 30 may include a billet which may be a cylinder of material with varying outer diameters (ranging from about 6 to about 12 inches (about 15 to about 30 cm)) and of different lengths (e.g. from about 4 to 5 feet (about 1.2 to about 1.5 m) in height), which may be understood as a substrate upon which the polymer is placed. As shown in FIG. 3, first shape-memory material 32 has an altered, run-in, thickness 34. Second shape-memory material 40 overlying first shape-memory material 32 and concentric therewith, has an altered, run-in thickness 36, which may be the same as or different from thickness 34. After a sufficient amount of time at a sufficient temperature at or above the onset $T_g$ of second shape-memory material 40, it expands from the run-in shape position (FIG. 3) to the recovered or set position (FIG. 4) having an expanded thickness. Similarly, after a sufficient amount of time at or above the $T_g$ of first shape-memory material 32, it expands from the run-in or altered position (FIG. 3) to the recovered or set position (FIG. 5) having an expanded thickness. In so doing, second shape-memory material 40 engages with inner wall surface 54 of wellbore casing 52. The entire distance 38 from billet 30 of the device to inner wall surface 54 will be occupied by the device—the device being understood as the combined first shape-memory material 32 and second shape-memory material 40. It will be appreciated that although the first and second shape-memory materials 32 and 40 of FIGS. 3-5 may be about the same thicknesses as shown in the FIGS., it is not necessary that they be—they may be of different thicknesses or geometries. Further, the positions of first and second shape-memory materials 32 and 40 may be reversed. In one non-limiting embodiment, the relatively harder, more rigid material may be the inner one. Additionally, it is not necessary that there be a clear boundary or demarcation between the shape-memory materials having different $T_g$s, as shown in FIGS. 3-5, and there may be more than two different materials each having their own, different $T_g$.

Figure 6:
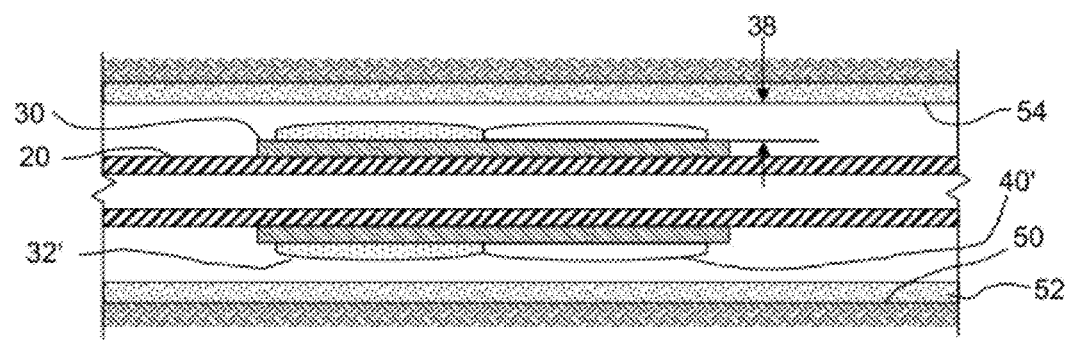
FIG. 6 is a schematic, cross-section view of an alternate embodiment of a device which bears two shape-memory materials having different onset $T_g$s in a side-by-side configuration along at least a portion of the length of the device in their altered geometric states, run-in thicknesses or volumes.
Figure 7:
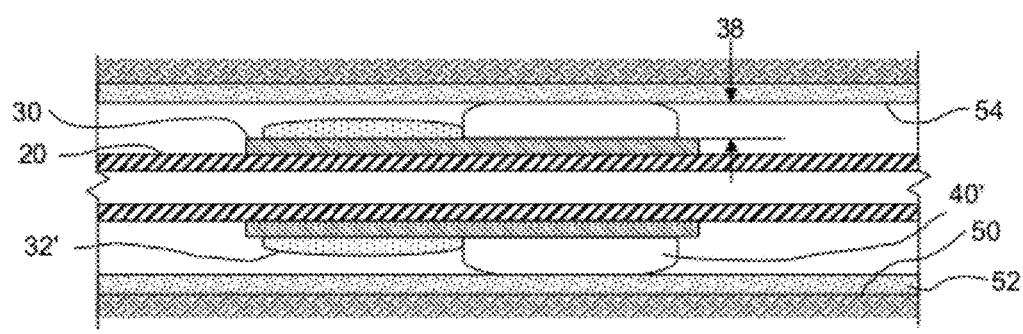
FIG. 7 is a schematic, cross-section view of the alternate embodiment of a device of FIG. 6 where one of the shape-memory materials has been permitted to recover or deploy so that it firmly engages and fits to the inner wall surface of the wellbore.
Figure 8:
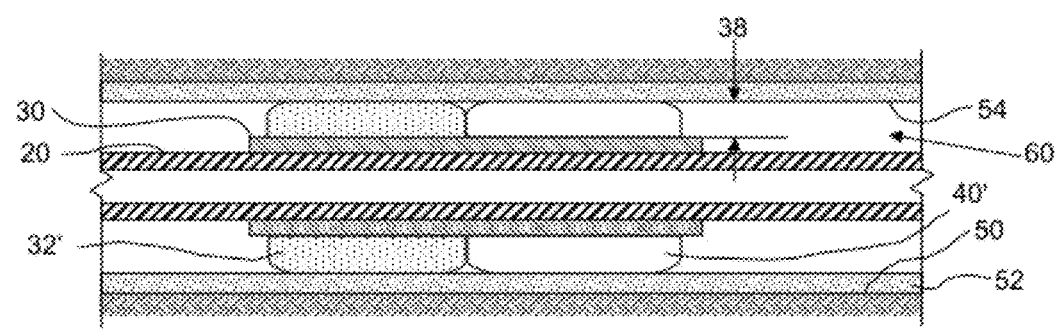
FIG. 8 is a schematic, cross-section view of the alternate embodiment of a device of FIG. 7 where the other of the shape-memory materials has been permitted to recover or deploy so that it firmly engages and fits to the inner wall surface of the wellbore.

Shown in FIGS. 6-8 is another non-limiting embodiment where the first shape-memory material 32' and second shape-memory material 40' are oriented next to each other along at least a portion of the length of the billet 30 or in a side-by-side relationship. In one non-restrictive version, they are not touching each other, but may be separated. In this embodiment, the $T_g$ of second shape-memory material 40' is lower than the $T_g$ of first shape-memory material 32' and is subject to an effective temperature for a sufficient amount of time to cause it to recover or enlarge to the recovered or set position shown in FIG. 7. In this embodiment, its recovered or set position would be sufficient to substantially contact and engage inner wall surface 54 across the entire distance 38. For instance, it may be desirable for a filtration device that certain size of particle to flow through the expanded device 40'. However, if there is a subsequent time when no particles are desired to be permitted to flow through the annulus 60, but only liquids are permitted to flow, then the tool 30 may be subjected to a higher temperature for a sufficient period of time to expand or enlarge first shape-memory material 32' to its original or expanded shape, as shown in FIG. 8, to completely bridge or occupy the distance 38. In this non-restrictive embodiment, for instance, the filtration device may contain open cells of polymer material 32' that are much smaller than the open cells of polymer material 40' so that only fluids are passed through annulus 60 and no particles of appreciable size are permitted to pass through the smaller cells of the filtration device. Of course, it will be appreciated that the configurations of FIGS. 3-5 and 6-8 may be combined and that first shape-memory material 32 and second shape-memory material 40 may be arranged or configured in any number of designs. Indeed, the two or more shape memory materials having different $T_g$s and/or different slope changes from each other may be mixed together in complex geometrical configurations.

Further, when it is described herein that a device "totally conforms" to the borehole, what is meant is that the shape-memory material recovers or deploys to fill the available space up to the borehole wall. The borehole wall will limit the final, recovered shape of the shape-memory material and in fact not permit it to expand to its original, geometric shape. In this way however, the recovered or deployed shape-memory material, will perform the desired function within the wellbore.

It is to be understood that the invention is not limited to the exact details of construction, operation, exact materials, or embodiments shown and described, as modifications and equivalents will be apparent to one skilled in the art. Accordingly, the invention is therefore to be limited only by the scope of the appended claims. Further, the specification is to be regarded in an illustrative rather than a restrictive sense. For example, specific combinations of components to make the polyurethane/urea thermoplastic, particular $T_g$s, specific downhole tool configurations, designs and other compositions, components and structures falling within the claimed parameters, but not specifically identified or tried in a particular method or apparatus, are anticipated to be within the scope of this invention.

The terms "comprises" and "comprising" in the claims should be interpreted to mean including, but not limited to, the recited elements.

The present invention may suitably comprise, consist or consist essentially of the elements disclosed and may be practiced in the absence of an element not disclosed.

What is claimed is:

1. A method of manufacturing a wellbore device, the method comprising:
   (a) mixing a first isocyanate portion comprising an isocyanate with a first polyol portion comprising a polyol in a first ratio of polyol to isocyanate to form a first polyurethane material on a cylindrical billet having a first original geometric position and having a first onset glass transition temperature $T_g$;
   (b) mixing a second isocyanate portion comprising an isocyanate with a second polyol portion comprising a polyol in a second ratio of polyol to isocyanate to form a second polyurethane material on the same cylindrical billet having a second original geometric position and having a second onset glass transition temperature $T_g$, where the first onset $T_g$ and the second onset $T_g$ are different;
(c) altering the geometric shapes of the first and second polyurethane materials at a temperature above both the first and second onset $T_g$ to change the geometric shapes of the first and second polyurethane materials respectively; and
(d) lowering the temperature of the first and second polyurethane materials to a temperature below the first and second onset $T_g$s, respectively, where the first and second polyurethane materials each maintain their respective altered geometry.

2. The method of claim 1, wherein the first and second polyol portions each comprise a mixture of polyol and water.

3. The method of claim 1, wherein the first and second polyol portions each comprise water, a chain extender and a catalyst selected from the group consisting of amine-based catalysts, metal-based catalysts and mixtures thereof.

4. The method of claim 1, wherein the first and second polyol portions each comprise water, a chain extender, a catalyst, and a surfactant.

5. The method of claim 1 where the cylindrical billet has a length, and where the first polyurethane material and the second polyurethane material have a configuration selected from the group consisting of:
concentric layers, where one of the polyurethane materials at least partially overlaps the other polyurethane material;
side-by-side each other along at least a portion of the length of the billet; and
combinations thereof.

* * * * *